United States Patent
Lee

(10) Patent No.: US 10,658,631 B2
(45) Date of Patent: May 19, 2020

(54) SECONDARY BATTERY

(71) Applicant: SAMSUNG SDI CO., LTD., Yongin-si, Gyeonggi-do (KR)

(72) Inventor: Sangjoo Lee, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 474 days.

(21) Appl. No.: 14/658,119

(22) Filed: Mar. 13, 2015

(65) Prior Publication Data

US 2016/0036014 A1 Feb. 4, 2016

(30) Foreign Application Priority Data

Aug. 1, 2014 (KR) .................. 10-2014-0099299

(51) Int. Cl.
*H01M 2/02* (2006.01)
(52) U.S. Cl.
CPC .................. *H01M 2/0267* (2013.01)
(58) Field of Classification Search
CPC ..... G09F 2003/0266; G09F 2003/0267; G09F 2003/0269; G09F 3/0288; H01M 2/0275; H01M 2/0267; H01M 2/0456
USPC ...................................... 156/304.2
See application file for complete search history.

(56) References Cited

U.S. PATENT DOCUMENTS 5,695,061 A * 12/1997 Stompe .............. A47F 5/0068
206/449
7,682,734 B2 3/2010 Jeon
7,687,190 B2 * 3/2010 Jang .................... H01M 2/021
429/129
8,273,433 B2 * 9/2012 Flynn ................ B42D 15/045
428/40.1
9,793,704 B2 * 10/2017 Choi .................... H01M 10/04
(Continued)

FOREIGN PATENT DOCUMENTS

| CN | 1741300 A | 3/2006 |
|---|---|---|
| KR | 20-2011-0002869 U | 3/2011 |
| KR | 10-2014-0009772 A | 1/2014 |

OTHER PUBLICATIONS

SIPO Office Action, for Chinese Patent Application No. CN 201510357962.7, dated Dec. 13, 2018, 7 pages.
(Continued)

*Primary Examiner* — Jimmy Vo
(74) *Attorney, Agent, or Firm* — Lewis Roca Rothgerber Christie LLP

(57) ABSTRACT

A secondary battery includes an electrode assembly having a curved shape and comprising a first electrode plate, a second electrode plate, and a separator located between the first electrode plate and the second electrode plate, an exterior member comprising a first exterior member on a first surface of the electrode assembly, a second exterior member on a second surface of the electrode assembly, and wings providing a sealing surface by coupling the first exterior member and the second exterior member, and a label covering an outer surface of the exterior member, wherein the label comprises a label body sheet that is attached to the first exterior member, and a plurality of label wings that are folded from a first edge of the label body sheet in a first direction, cover the exterior member from side surfaces of the exterior member to the second exterior member, and have at least one cutting slot.

12 Claims, 5 Drawing Sheets

(56) References Cited

U.S. PATENT DOCUMENTS

| | | | | |
|---|---|---|---|---|
| 2006/0233994 A1* | 10/2006 | Hodsdon | ................... | B32B 3/02 |
| | | | | 428/40.1 |
| 2012/0183825 A1* | 7/2012 | Lee | ................... | H01M 10/0431 |
| | | | | 429/94 |
| 2013/0034752 A1* | 2/2013 | Choi | ..................... | H01M 2/022 |
| | | | | 429/7 |
| 2014/0109397 A1* | 4/2014 | Devan | ................. | H01M 10/049 |
| | | | | 29/623.2 |

OTHER PUBLICATIONS

Partial English translation of the SIPO Office Action, for Chinese Patent Application No. CN 201510357962.7, dated Dec. 13, 2018, 8 pages.

* cited by examiner

SECONDARY BATTERY

CROSS-REFERENCE TO RELATED APPLICATION

This application claims priority to and the benefit of Korean Patent Application No. 10-2014-0099299, filed on Aug. 1, 2014, in the Korean Intellectual Property Office, the disclosure of which is incorporated herein in its entirety by reference.

BACKGROUND

1. Field

One or more embodiments of the present invention relate to a secondary battery.

2. Description of the Related Art

In general, a secondary battery is chargeable and dischargeable.

Secondary batteries have been widely used not only in small mobile apparatuses such as smartphones, laptops, tablet personal computers, portable information terminals, camcorders, and digital cameras, but in medium and large-sized apparatuses such as electric vehicles, hybrid electric vehicles, electric bicycles, uninterruptible power supplies (UPS), and energy storage systems (ESS).

The secondary battery may be formed in various shapes according to the structure of an electric/electronic apparatus on which the secondary battery is mounted. For example, the secondary battery may include a curved surface. In a manufacturing process, the secondary battery includes a label that covers an exterior member thereof.

SUMMARY

One or more embodiments of the present invention include a secondary battery.

Additional aspects will be set forth in part in the description which follows and, in part, will be apparent from the description.

According to one or more embodiments, a secondary battery includes an electrode assembly that has a curved shape and includes a first electrode plate, a second electrode plate, and a separator disposed between the first electrode plate and the second electrode plate; an exterior member that comprises a first exterior member disposed on a first surface of the electrode assembly, a second exterior member disposed on a second surface of the electrode assembly, and a wing that provides a sealing surface by combining the first exterior member and the second exterior member; and a label that covers an outer surface of the exterior member, wherein the label includes a label body sheet that attaches to the first exterior member, and a plurality of label wings that are folded from a first edge of the label body sheet in a first direction, cover the exterior member from side surfaces of the exterior member to the second exterior member, and have at least one cutting slot.

In some embodiments, the plurality of label wings are each independently folded by the cutting slot, and the cutting slot is formed across the label wing from the edge of the label wing toward the label body sheet.

In some embodiments, the wings of the exterior member are folded at least one time toward the side surfaces of the exterior member, and the fore ends of the wings of the exterior member are placed between the first exterior member and the second exterior member, the plurality of label wings cover the fore ends of the wings of the exterior member, and the cutting slot is formed between the fore end of the wing of the exterior member and the edge of the label wing.

In some embodiments, the label body sheet includes a side wall between the first edge of the label body sheet and a upper portion of the cutting slot to completely cover the fore end of the wing of the exterior member.

In some embodiments, the plurality of label wings are extended from the first edge of the label body sheet in a first direction, and cover from both side surfaces of the exterior member to the second exterior member.

In some embodiments, the plurality of label wings are arranged apart from each other by the cutting slot in a second direction intersecting to the first direction and have different sizes from each other.

In some embodiments, the cutting slot is formed in one of shapes such as a shape including a linear line, a shape including an oblique line, and a slot shape that changes the path at least one time.

In some embodiments, the secondary battery further includes an auxiliary label wing that is folded along a second edge of the label body sheet intersecting to the first edge of the label body sheet, and covers from a side surface of the exterior member to the second surface of the exterior member.

In some embodiments, the label wings cover both side surfaces of the first direction of the exterior member facing each other, and the auxiliary label wing covers the side surface of the exterior member that intersects to the first direction.

In some embodiments, at least a part of the label wings and at least a part of the auxiliary label wing overlap with each other on the second exterior member.

In some embodiments, the label body sheet, the plurality of label wings, and the auxiliary label wing are integrally formed.

In some embodiments, the exterior member has a curved shape corresponding to the electrode assembly, the first exterior member forms a convex surface, and the second exterior member forms a concave surface.

In some embodiments, one side of the first exterior member and one side of the second exterior member are integrally formed, and the wings having a sealing surface are formed by combining the edge of the first exterior member and the edge of the second exterior member with each other.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
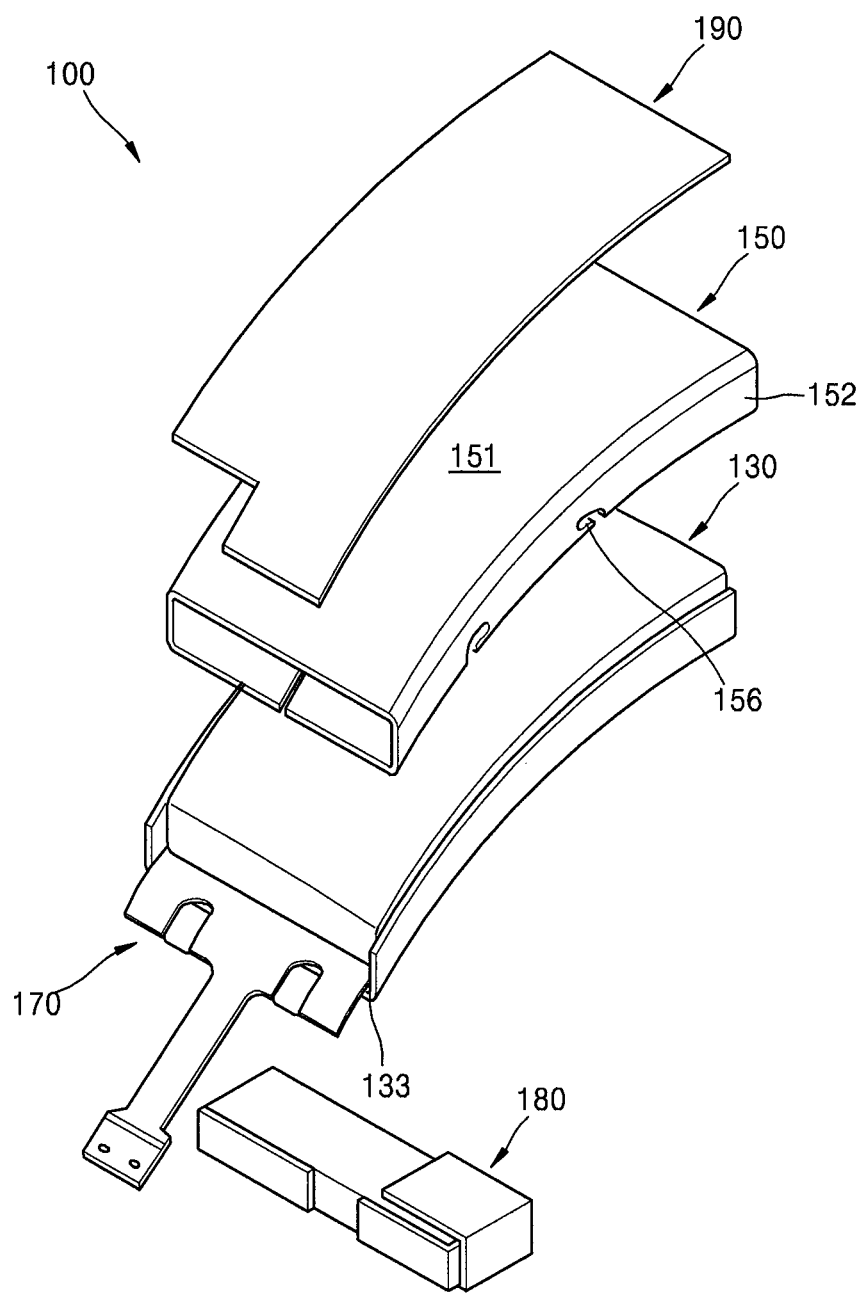
FIG. 1 is a partially exploded perspective view of a curved secondary battery according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of" when preceding a list of elements, modify the entire list of elements and do not modify the individual elements of the list.

As the invention allows for various changes and numerous embodiments, exemplary embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of the related art are omitted when it is deemed that they may unnecessarily obscure the essence of the invention.

While such terms as "first", "second", etc., may be used to describe various components, such components must not be limited to the above terms. The above terms are used only to distinguish one component from another.

The terms used in the present specification are merely used to describe exemplary embodiments, and are not intended to limit the present invention. An expression used in the singular encompasses the expression of the plural, unless it has a clearly different meaning in the context. In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The present invention will now be described more fully with reference to the accompanying drawings, in which exemplary embodiments of the invention are shown. Like reference numerals in the drawings denote like elements, and thus their description will be omitted.

Figure 2:
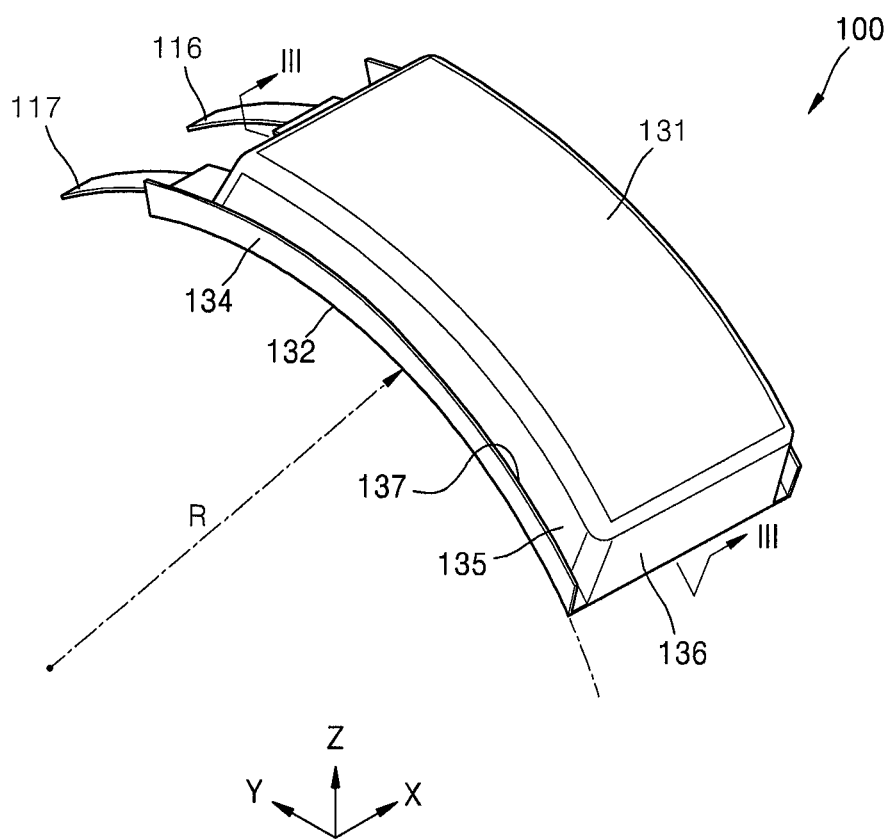
FIG. 2 is a perspective view of the curved secondary battery of FIG. 1.
Figure 3:
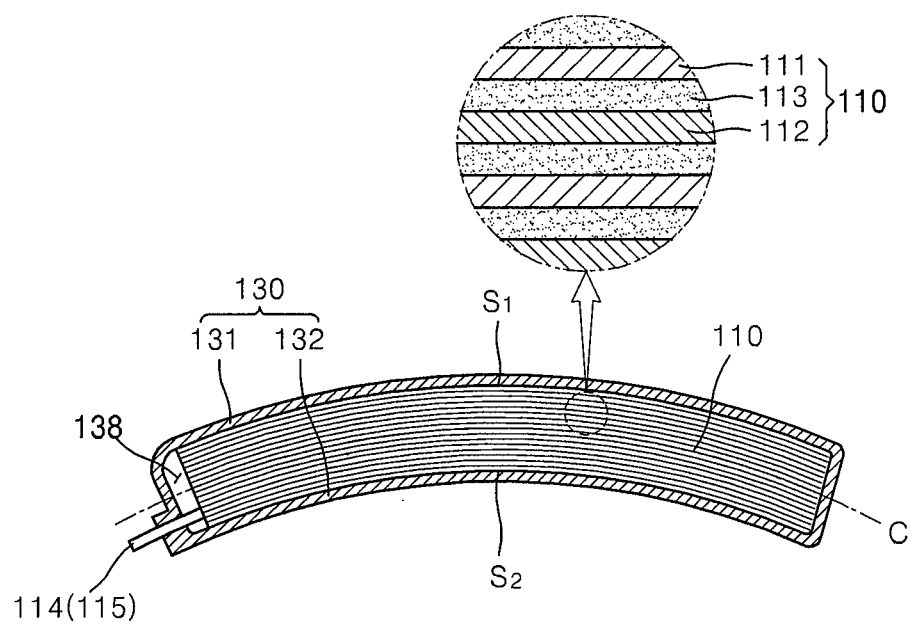
FIG. 3 is a cross-sectional view taken along a line III-III of FIG. 2.
Figure 4:
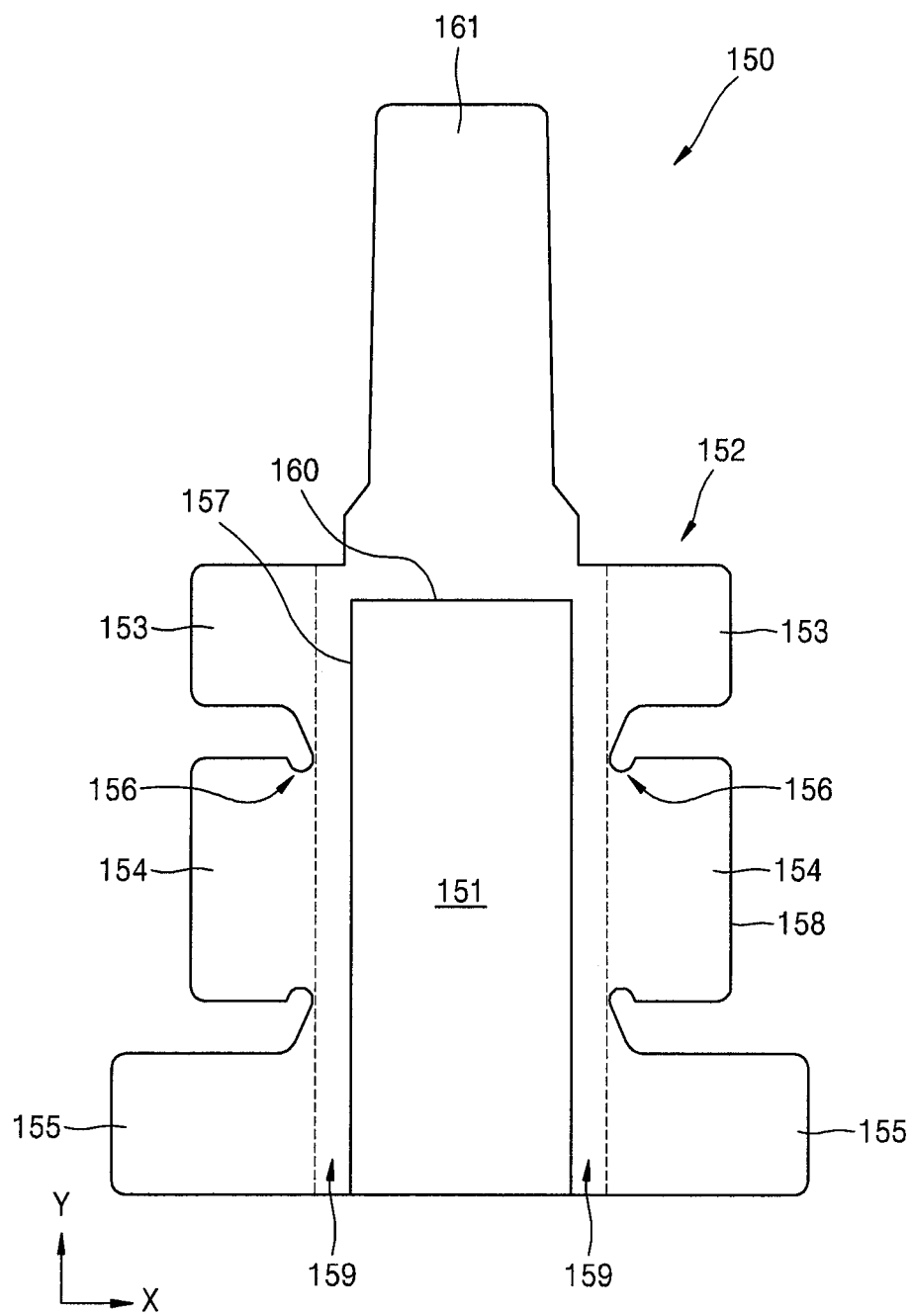
FIG. 4 is a plan view showing a label of FIG. 1.
Figure 5:
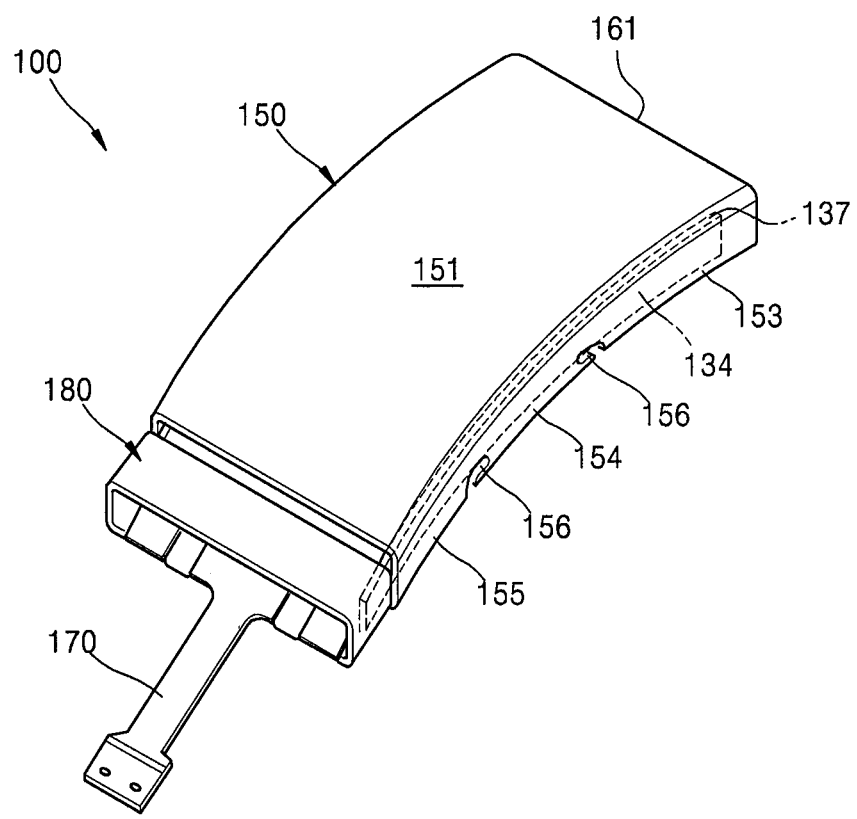
FIG. 5 is a perspective view illustrating the assembled state of the secondary battery of FIG. 1.

FIG. 1 is an exploded perspective vies of a curved secondary battery according to an embodiment of the present invention. FIG. 2 is a perspective view of the curved secondary battery of FIG. 1. FIG. 3 is a cross-sectional view taken along a line III-III of FIG. 2. FIG. 4 shows a label of FIG. 1. FIG. 5 is a perspective view illustrating the assembled state of the secondary battery of FIG. 1.

In some embodiments of the present invention, the secondary battery is described as the curved secondary battery, but the shape of the secondary battery is not limited thereto.

Referring to FIGS. 1 to 5, the curved secondary battery 100 may be formed in a curved shape to have a predetermined radius of curvature R. The curved secondary battery 100 may have a curved surface corresponding to an electric/electronic apparatus on which the curved secondary battery 100 is mounted. In this regard, unnecessary space between the electric/electronic apparatus and the curved secondary battery 100 may be minimized.

The curved secondary battery 100 may include an electrode assembly 110, an exterior member 130 that accommodates the electrode assembly 110, a label 150 that covers the exterior member 130, and a circuit board 170 that is electrically connected to the electrode assembly 110.

The electrode assembly 110 may include a first electrode plate 111, a second electrode plate 112, and a separator 113 located between the first electrode plate 111 and the second electrode plate 112. The electrode assembly 110 may be a sequentially stacked structure of the first electrode plate 111, the separator 113, and the second electrode plate 112.

Although in the present embodiment the electrode assembly 110 is a stack type in which the electrode plates having different polarities from each other are stacked, the electrode assembly 110 may also be, for example, a jelly-roll type in which the electrode plates having different polarities from each other are wound in one direction, or a stack-and-folding type that is a mixed version of the stack-type and the jelly-roll type.

The electrode assembly 110 may be bent in a lengthwise direction (Y direction), and a winding axis C may be a curved line. The electrode assembly 100 may include a first surface S1 that is convexly bent toward an outside of the curved secondary battery 100 toward an outside of the electrode assembly 110 and a second surface S2 that is the opposite surface to the first surface and concavely bent toward an inside of the of the electrode assembly 110.

The first electrode plate 111 and the second electrode plate 112 have different polarities. If the first electrode plate 111 is a positive electrode plate, the second electrode plate 112 is a negative electrode plate. Otherwise, if the first electrode plate 111 is a negative electrode plate, the second electrode plate 112 is a positive electrode plate.

Hereinafter, for convenience, it is assumed that the first electrode plate 111 is a positive electrode plate while the second electrode plate 112 is a negative electrode plate.

The first electrode plate 111 may include a first electrode active material part on which a first electrode active material is coated, and a first electrode uncoated part on which the first electrode active material is not coated. The first electrode active material part, for example, may be formed by coating the first electrode active material on at least one side of a first metal plate. The first electrode uncoated part may be a part of the first metal plate on which the first electrode active material is not coated. The first metal plate may include an aluminum plate. The first electrode active material may include lithium-containing transition metal oxides such as $LiCoO_2$, $LiNiO_2$, $LiMnO_2$, $LiMnO_4$ or a lithium chalcogenide compound.

A first electrode tab 114 may be electrically connected to the first electrode plate 111. The first electrode tab 114 may be electrically connected to the first electrode uncoated part by welding and the like, or may be integrally extended from the first electrode uncoated part.

Each of the first electrode tabs 114 may be drawn from each of the first electrode plates 111, for the electrode assembly 110 is a stack-type. The first electrode tabs 114 may be gathered at one side of the short ends of the electrode assembly 110. The first electrode tabs 114 may be electrically connected to a first electrode lead 116.

If the electrode assembly 110 is a jelly-roll type, the first electrode plate 111 is wound in one direction, and the first electrode tab 114 that is single and electrically connected to the first electrode plate 111 may be used as a connection terminal without the first electrode lead 116. However, the present invention is not limited to the aforementioned examples.

The second electrode plate 112 may include a second electrode active material part on which a second electrode active material is coated, and a second electrode uncoated part on which the second electrode active material is not coated. The second electrode active material part, for example, may be formed by coating the second electrode active material on at least one side of a second metal plate. The second electrode uncoated part may be a part of the second metal plate on which the second electrode active material is not coated. The second metal plate may include a copper plate. The second electrode active material may include a carbon material such as crystalline carbon, amorphous carbon, carbon composites, and carbon fiber, or a lithium metal, or a lithium alloy.

A second electrode tab 115 may be electrically connected to the second electrode plate 112. The second electrode tab 115 may be electrically connected to the second electrode uncoated part by welding or the like, or be integrally extended from the second electrode uncoated part.

The second electrode tabs 115 may extend from the second electrode plate 112 and may be gathered at one side of the short ends of the electrode assembly 110 in which the first electrode tabs 114 are disposed. The plurality of second electrode tabs 115 may be electrically connected to one second electrode lead 117. In some embodiments, the second electrode tabs 115 may be oriented in an opposite direction to the first electrode tabs 114.

The separator 113 may be a porous polymer film such as a polyethylene film and a polypropylene film, be in form of a woven fabric including a polymer fiber or a non-woven fabric, include ceramic particles, or be formed of a solid polymer electrolyte.

The separator 113 may be formed as a separate film, or as a non-conductive porous film on the first electrode plate 111 or the second electrode plate 112. The separator 113 is not necessarily formed in the same shape as the first electrode plate 111 or the second electrode plate 112.

The exterior member 130 may seal the electrode assembly 110, and accommodate an electrolyte along with the electrode assembly 110. The exterior member 130 may have a flexible pouch-type structure.

The exterior member 130 may be a three-layer structure of an insulating layer, a metal layer, and an insulating layer. For example, the metal layer may be formed of aluminum (Al), steel, stainless steel and the like, and the insulating layer may be formed of casted polypropylene (CPP), polyethyleneterephthalate (PET), nylon and the like.

The exterior member 130 may include a first exterior member 131 that is on the first surface S1 of the electrode assembly 110, a second exterior member 132 that is on the second surface S2 of the electrode assembly 110, and a pair of wings 134 in which each wing 134 provides a sealing surface 133 by combining the first exterior member 131 and the second exterior member 132.

The exterior member 130 may have the same curved shape as the electrode assembly 110. The first exterior member 131 forms a convex surface like the first surface S1 of the electrode assembly 110 whereas the second exterior member 132 forms a concave surface like the second surface S2 of the electrode assembly 110.

One side of the first exterior member 131 and one side of the second exterior member 132 may be integrally formed. The first exterior member 131 may provide an accommodation space 138 to accommodate the electrode assembly 110.

After the electrode assembly 110 is accommodated within the accommodation space 138, the second exterior member 132 may be folded over the first exterior member 131, and then the edges of the first exterior member 131 and the edges of the second exterior member 132 may be combined to each other forming the wings 134. Each wing 134 provides a sealing surface 133 as the first exterior member 131 and the second exterior member 132 are combined to each other by heat fusion.

The wings 134 may be formed at either edge of the exterior member 130 in a lengthwise direction (Y direction) of the exterior member 130, and folded over the side surfaces of the exterior member 130. Although in the present embodiment the wings 134 are folded once, the present invention is not limited thereto and, for example, the wings 134 may be folded twice or more.

The label 150 may wrap the exterior member 130 and may keep the shape of the exterior member 130 when manufactured. For example, the label 150 may prevent the wings 134 folded over the sides of the exterior member 130 from unfolding by covering the exterior member 130. The label 150 may also be used to facilitate identification of the exterior member 130.

The label 150 may include a label body sheet 151 that is attached to the first exterior member 131, and label wings 152 that are folded in a widthwise (X direction) and cover the exterior member 130 from the sides of the exterior member 130 to the second exterior member 132.

A double-sided adhesive tape 190 may be attached on the label body sheet 151. A display panel may be attached on the double-sided tape 190.

The circuit board 170 may be located at one region of the sealing surface 133, and in one embodiment, it may be located along a side of a short end of the exterior member 130 at which the first electrode lead 116 and the second electrode lead 117 are located, to connect to the first electrode lead 116 and the second electrode lead 117. The circuit board 170 may include a protection circuit module (PCM). A circuit board tape 180 may cover at least one portion of the circuit board 170.

The curved secondary battery 100 is formed in a curved shape to have a predetermined radius of curvature in a molding process. During manufacturing, the wings 134 of the exterior member 130 are folded at least one time in a direction parallel to the sides of the curved secondary battery 100. The label 150 covers the outer surface of the exterior member 130.

The structure of the label 150 according to an embodiment of the present invention may be described as follows.

The label 150 covers the outer surface of the exterior member 130 without creases, and has a specific shape to cover a fore end 137, which is a cutting surface of each of the wings 134.

The label body sheet 151 may be attached to the convex surface of the exterior member 130. The label body sheet 151 is a flat and thin sheet. Since the first exterior member 131 forms a convex surface, the label body sheet 151 may be attached to the outer surface of the first exterior member 131. The label body sheet 151 is sized to cover the first exterior member 131.

The label wings 152 may be formed at each of edges 157 (Y direction) of the label body sheet 151. The label wings 152 may include a first label wing 153, a second label wing 154, and a third label wing 155 that are spaced from each other in the Y direction. According to an embodiment of the present invention, the label wings 152 include three label wings 153 to 155 at each side thereof, but the number of the label wings 152 is not limited thereto.

Cutting slots 156 are formed between the first to third label wings 153 to 155 which are aligned adjacent to each other to separate the first to third label wings 153 to 155 from each other. The first to third label wings 153 to 155 are separated from each other by the cutting slots 156, and thus each label wing may be independently folded.

The cutting slots 156 are formed across the first to third label wings 153 to 155 from edges 158 of the first to third label wings 153 to 155 toward the label body sheet 151. The cutting slots 156 may be each formed between the first label wing 153 and the second label wing 154, and the second label wing 154 and the third label wing 155.

The cutting slots 156 may be formed in a linear shape, an oblique shape, or a shape that changes directions at least one time (i.e., forms a non-linear or non-straight path), on the side surfaces of the exterior member 130. For example, the cutting groove 156 may have a shape extending in a straight line and then bent obliquely at an end point of the straight line In one embodiment, the first to third label wings 153 to 155 may extend outward from both of the edges 157 of the label body sheet 151. The first to third label wings 153 to 155 are folded along the edges 157 of the label body sheet 151 to cover the side surfaces 135 of the exterior member 130 where the wings 134 of the exterior member 130 are folded. The first to third label wings 153 to 155 may extend from the both side surfaces 135 of the exterior member 130 even to cover the second exterior member 132.

A side wall 159 may be formed between the edge 157 of the label body sheet 151 and an upper end of each of the cutting slots 156. The side wall 159 has a height that completely covers each of the fore ends 137, which are the cutting surfaces of the wings 134, when the wings 134 are folded toward the side surfaces 135 of the exterior member 130. The side walls 159 are extended in the lengthwise direction (Y direction) of the label 150.

The fore ends 137 of the wings 134 are not exposed to the outside through the cutting slots 156. In other words, the cutting slots 156 are located between the fore ends 137 of the wings 134 and the edges 158 of the first to third label wings 153 to 155.

The first to third label wings 153 to 155 are sized to cover the side surfaces 135 formed in the lengthwise direction (Y direction) of the exterior member 130 and the second exterior member 132. In other words, the first to third label wings 153 to 155 each independently extend from the edges 157 of the label body sheet 151, and cover from both side surfaces 135 of the exterior member 130 to the second exterior member 132.

In one embodiment, the first to third label wings 153 to 155 may have different sizes from one another. For example, the lengthwise of the third label wings 155 may be longer than those of the first label wings 153 and the second label wings 154. Forming the third label wings 155 bigger than the first label wings 153 and the second label wings 154 is to increase an attachment area of the label 150 with respect to the exterior member 130.

The label 150 may further include an auxiliary label wing 161 extending outward from one edge 160 (X direction) of the label body sheet 151 that is perpendicular to the edges 157 (Y direction) of the label body sheet 151. The auxiliary label wing 161 extends outward from one of the edges 160 (X direction) of the label body sheet 151. The auxiliary label wing 161 is formed at the side opposite to the sealing surface 133 on which the circuit board 170 is mounted.

The auxiliary label wing 161 is folded along one of the edges 160 of the label body sheet 151, and may cover from one side surface 136 (X direction) of the exterior member 130 to the second exterior member 132. At least one portion of the auxiliary label wing 161 may be formed to overlap with the first to third label wings 153 to 155 on the second exterior member 132.

The label body sheet 151, the first to third label wings 153 to 155, and the auxiliary label wing 161 may be integrally formed as a single component.

The label 150 configured as above covers the exterior member 130 as follows.

First, the curved secondary battery 100 is manufactured in a curved shape by using a jig. The wings 134 of the exterior member 130 are folded at least one time toward the side surfaces 135 of the exterior member 130. The fore ends 137 of the folded wings 134 are located at the side surfaces 135 of the exterior member 130 in the lengthwise direction (Y direction) of the exterior member 130.

Next, the label body sheet 151 is attached on the first exterior member 131 forming a convex surface of the exterior member 130. In one embodiment, the label body sheet 151 completely covers the first exterior member 131.

Then, the first to third label wings 153 to 155 extended from the both edges 157 of the label body sheet 151 are folded toward the side surfaces 135 of the exterior member 130.

Each of the first to third label wings 153 to 155 covers the side surfaces 135 of the exterior member 130 by independently covering the side surfaces 135 of the exterior member 130. The first to third label wings 153 to 155 are each independently extended from the edges 157 of the label body sheet 151, and thus both ends of each of the first to third label wings 153 to 155 overlap each other on the second exterior member 132. In some embodiments, the first to third label wings 153 to 155 may be attached to the second exterior member 132 without overlapping each other as both ends thereof contact each other on the second exterior member 132.

The fore ends 137 of the wings 134, which are the cutting surfaces formed in a cutting process, may have a burr. The side walls 159 are formed to cover the fore ends 137 of the wings 134 between the edges 157 of the label body sheet 151 and the upper portions of the cutting slots 156. The side walls 159 may completely cover the fore ends 137 of the wings 134, which are formed at the side surfaces 135 of the exterior member 130.

The cutting slots 156 may be formed between the fore ends 137 of the wings 134 and the edges 158 of the first to third label wings 153 to 155. The cutting slots 156 are formed at the lower portions of the fore ends 137 of the wings 134, thereby improving the flexibility or bendability of the first to third label wings 153 to 155 and simultaneously preventing the fore ends 137 of the wings 134 from being exposed to the outside through the cutting slots 156.

Then, the auxiliary label wing 161, which extends outward from one of the edges 160 (Y direction) of the label body sheet 151, is folded from the side surfaces 136 of the exterior member 130 toward the second exterior member 132 in order to cover the exterior member 130.

The auxiliary label wing 161 may be attached to the second exterior member 132 such that at least one portion of the auxiliary label wing 161 overlaps the first to third label wings 153 to 155. In this regard, the adhesive strength of the label 150 with respect to the exterior member 130 may be increased because the auxiliary label wing 161 overlaps the first to third label wings 153 to 155.

As described above, according to an aspect of one or more embodiments of the present invention, the secondary battery may cover the exterior member with a label without creases, and safely cover the cutting surface of the wings of the exterior member.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A secondary battery comprising:
    an electrode assembly having a curved shape and comprising a first electrode plate, a second electrode plate, and a separator located between the first electrode plate and the second electrode plate,
    an exterior member comprising a first exterior member on a first surface of the electrode assembly, a second exterior member on a second surface of the electrode assembly, and exterior member wings providing a sealing surface by coupling the first exterior member and the second exterior member, the exterior member wings being folded to extend perpendicular to the first and second surfaces of the electrode assembly, and
    a label covering an outer surface of the exterior member, wherein the label comprises:
    a label body sheet that is attached to the first exterior member,
    a plurality of label wings that are folded from a first edge of the label body sheet in a first direction and cover the exterior member including the folded exterior member wings from side surfaces of the exterior member to the second exterior member to prevent the folded exterior member wings from unfolding, and
    at least one cutting slot, wherein the at least one cutting slot is located between adjacent ones of the label wings such that the label wings are independently foldable, the at least one cutting slot is defined to extend past a periphery of a respective one of the label wings, and the at least one cutting slot is formed across the respective label wing from a first edge of the label wing toward the label body sheet.

2. The secondary battery of claim 1, wherein fore ends of the exterior member wings are located between the first exterior member and the second exterior member,
    wherein the plurality of label wings cover the fore ends of the exterior member wings, and
    wherein the cutting slot is located between the fore end of a respective exterior member wing and an edge of the label wing.

3. The secondary battery of claim 2, wherein the label body sheet comprises a side wall between the first edge of the label body sheet and an upper portion of the cutting slot to completely cover the fore end of the exterior member wing.

4. The secondary battery of claim 1, wherein the plurality of label wings extend from the first edge of the label body sheet in a first direction, and cover from both side surfaces of the first exterior member to the second exterior member.

5. The secondary battery of claim 4, wherein the plurality of label wings are spaced from each other by the cutting slot in a second direction intersecting the first direction and wherein the label wings are different sizes.

6. The secondary battery of claim 1, wherein the cutting slot is linear, includes an oblique line, or is a shape that changes directions at least one time.

7. The secondary battery of claim 1, further comprising an auxiliary label wing that is folded along a second edge of the label body sheet intersecting the first edge of the label body sheet, and covers from a side surface of the exterior member to a second surface of the exterior member.

8. The secondary battery of claim 7, wherein the label wings cover both side surfaces of the first direction of the exterior member facing each other, and the auxiliary label wing covers the side surface of the exterior member that intersects the first direction.

9. The secondary battery of claim 8, wherein at least a part of the label wings and at least a part of the auxiliary label wing overlap each other on the second exterior member.

10. The secondary battery of claim 7, wherein the label body sheet, the plurality of label wings, and the auxiliary label wing are integrally formed.

11. The secondary battery of claim 1, wherein the exterior member has a curved shape corresponding to the electrode assembly,
    wherein the first exterior member forms a convex surface, and
    wherein the second exterior member forms a concave surface.

12. The secondary battery of claim 1, wherein one side of the first exterior member and one side of the second exterior member are integrally formed, and the exterior member wings having a sealing surface are formed by the edge of the first exterior member and the edge of the second exterior member being coupled to each other.

* * * * *